(12) United States Patent
Janczak et al.

(10) Patent No.: US 9,905,046 B2
(45) Date of Patent: Feb. 27, 2018

(54) MAPPING MULTI-RATE SHADING TO MONOLITHIC PROGRAMS

(71) Applicant: Intel Corporation, Santa Clara, CA (US)

(72) Inventors: Tomasz Janczak, Gdansk (PL); Prasoonkumar Surti, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 48 days.

(21) Appl. No.: 14/492,471

(22) Filed: Sep. 22, 2014

(65) Prior Publication Data

US 2015/0287240 A1 Oct. 8, 2015

Related U.S. Application Data

(60) Provisional application No. 61/974,602, filed on Apr. 3, 2014.

(51) Int. Cl.
*G06T 15/80* (2011.01)
*G06T 15/00* (2011.01)

(52) U.S. Cl.
CPC .......... *G06T 15/80* (2013.01); *G06T 15/005* (2013.01)

(58) Field of Classification Search
None
See application file for complete search history.

(56) References Cited

U.S. PATENT DOCUMENTS

| | | | |
|---|---|---|---|
| 6,226,005 B1* | 5/2001 | Laferriere | G06T 15/50 345/426 |
| 7,379,067 B2 | 5/2008 | Deering et al. | |
| 7,750,914 B2 | 7/2010 | Lake et al. | |
| 8,427,487 B1 | 4/2013 | Crow | |
| 2011/0314411 A1* | 12/2011 | Sayers | G06F 17/30991 715/781 |
| 2015/0070355 A1* | 3/2015 | Clarberg | G06T 15/005 345/426 |
| 2015/0170408 A1* | 6/2015 | He | G06T 15/80 345/426 |

FOREIGN PATENT DOCUMENTS

| | | |
|---|---|---|
| CN | 101620725 A | 1/2010 |
| CN | 103403671 A | 11/2013 |

(Continued)

OTHER PUBLICATIONS

Korean office action in corresponding KR application No. 10-2015-0029260 dated Nov. 6, 2015.

(Continued)

*Primary Examiner* — Edward Martello
(74) *Attorney, Agent, or Firm* — Trop Pruner & Hu, P.C.

(57) ABSTRACT

In multi-rate shading, a coarse-rate shading phase is added on top of existing pixel-rate phase to significantly improve performance with minimum impact to image quality. Two shading phases evaluated at different rates may be mapped to one monolithic program running on processor graphics single instruction multiple data (SIMD) engines. In one embodiment, multi-rate shading allows a single rendering pass to execute shading code at one or more different rates: per group of pixels, per pixel, and per sample.

30 Claims, 13 Drawing Sheets

(56) References Cited

FOREIGN PATENT DOCUMENTS

| KR | 20040106300 A | 12/2004 |
|----|---------------|---------|
| KR | 20070032080 A | 3/2007 |
| TW | 201339964 A | 10/2013 |

OTHER PUBLICATIONS

Taiwan office action in corresponding TW application No. 104106522 dated Dec. 30, 2015.
Taiwan office action in corresponding TW application No. 104106522 dated 09/236/2016.
CN office action in corresponding CN application No. 201510094383.8 dated May 27, 2017 (6 pages) [no English translation].

* cited by examiner

FIG. 1

COARSE PIXEL LAYOUT: 1X2

| ⁰A | ¹B |
|---|---|
| C | D |
| ²E | ³F |
| G | H |

SIMD4 EXECUTION SEQUENCE

| 0 | 1 | 2 | 3 |
|---|---|---|---|
| A | B | C | D |
| E | F | G | H |

COARSE PHASE

PIXEL PHASE #1
COARSE-TO-PIXEL-MAPPING=(0,1,0,1)
EXECUTION MASK=(1,1,1,0)

PIXEL PHASE #2
COARSE-TO-PIXEL-MAPPING=(2,3,2,3)
EXECUTION MASK=(1,1,0,1)

FIG. 2

COARSE PIXEL LAYOUT: 2X2

| ⁰A | ¹E | F |
|---|---|---|
| B | G | H |
| C | D | |
| ²I | ³M | N |
| J | O | P |
| K | L | |

SIMD4 EXECUTION SEQUENCE

| 0 | 1 | 2 | 3 |
|---|---|---|---|
| A | B | C | D |
| I | J | K | L |
| M | N | O | P |

COARSE PHASE
EXECUTION MASK=(1,0,1,1)

PIXEL PHASE #1
COARSE-TO-PIXEL-MAPPING=(0,0,0,0)
EXECUTION MASK=(0,1,1,1)

PIXEL PHASE #2
COARSE-TO-PIXEL-MAPPING=(2,2,2)
EXECUTION MASK=(1,1,0,1)

PIXEL PHASE #3
COARSE-TO-PIXEL-MAPPING=(3,3,3)
EXECUTION MASK=(1,1,1,0)

MAPPING MULTI-RATE SHADING TO MONOLITHIC PROGRAMS

CROSS-REFERENCE TO RELATED APPLICATION

This is a non-provisional application claiming priority to provisional application Ser. No. 61/974,602 filed Apr. 3, 2014, hereby expressly incorporated by reference herein.

BACKGROUND

A significant portion of the power cost in a 3D pipeline is due to pixel shading. Higher display resolutions and graphics quality, especially in handheld devices, are inconsistent with the need to minimize power dissipation. Running pixel shaders more efficiently would therefore be particularly advantageous.

Coarse pixel shading takes advantage of the fact that geometric occlusion typically introduces higher-frequency details compared to surface shading, and performs shading at a lower rate than visibility testing. Coarse pixel shading is well suited for high pixel density displays, where the effects of reduced shading rates are barely discernible from normal viewing distances. Shading rates may be further reduced in regions of the screen that are blurred or otherwise less perceivable to the user, for instance regions affected by motion or defocus blur, or regions outside the user's foveal vision.

It is difficult to take advantage of these opportunities on current graphics architectures, where shaders execute at per-pixel or per-sample rate. Shading rates may be coarsely controlled by varying frame buffer resolution, but this does not allow more fine grained variation of shading rates, e.g., per object, per triangle, or per image region, which are still coupled to the visibility sampling rate.

Coarse pixel shading (CPS) is an architecture for varying shading rates in a rasterization pipeline, while keeping the visibility sampling rate constant.

Many approaches have been proposed to improve shading efficiency by sampling shading at a lower rate than the visibility sampling rate. Multi-sample anti-aliasing (MSAA) is one such technique, often supported by graphics processor hardware. With MSAA, multiple coverage samples (also called visibility samples) are stored per pixel, but pixel shaders are only executed once for each pixel covered by a primitive. This is in contrast to super-sampling, in which shaders are executed once per covered sample.

BRIEF DESCRIPTION OF THE DRAWINGS

Some embodiments are described with respect to the following figures:

FIG. 1 depicts a coarse quad pixel layout and its 4-wide SIMD execution sequence according to one embodiment;

FIG. 2 depicts another coarse pixel layout and its 4-wide SIMD execution sequence according to one embodiment;

DETAILED DESCRIPTION

Figure 3A:
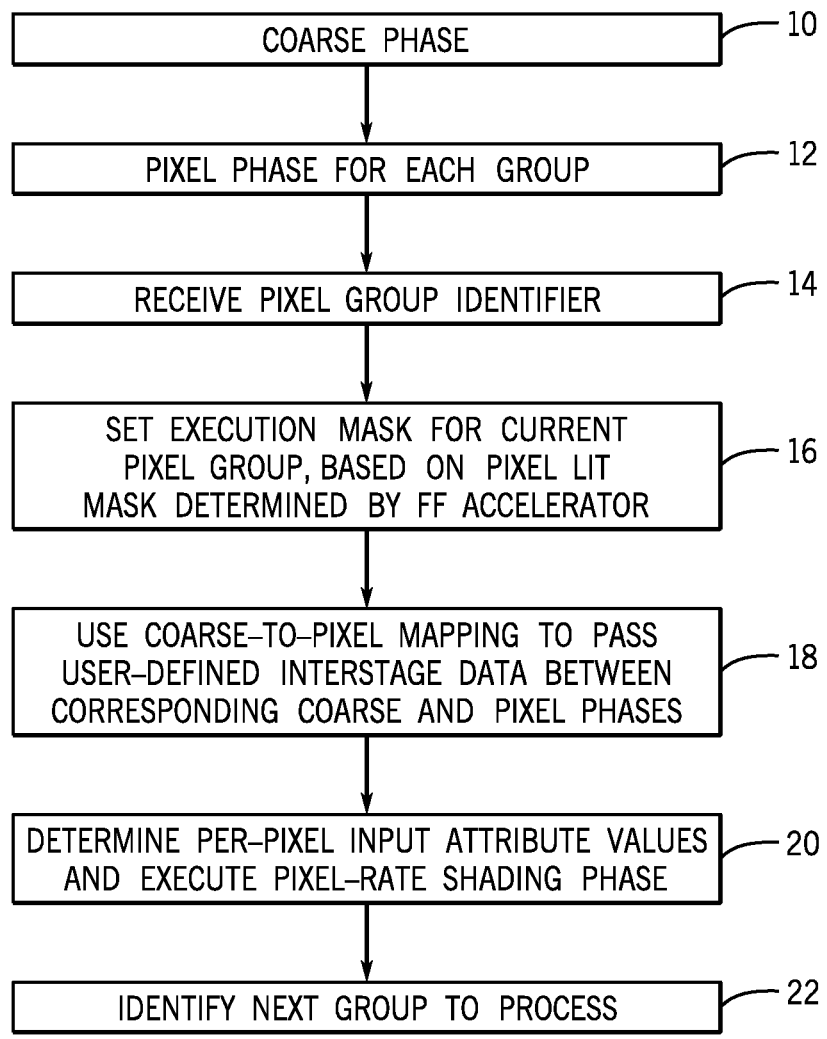
FIG. 3A is a flow chart for a kernel to handle both coarse and pixel rate shading according to one embodiment.

In coarse pixel shading (CPS), shading and visibility are sampled in a decoupled manner. Pixel shading is evaluated lazily over an image-space shading grid and temporarily stored in a memorization cache for reuse for regular or stochastic rasterization (SR). In another coarse pixel sampling approach, shading is sampled uniformly in parametric patch space in an optimized Reyes architecture. These techniques allow shading grids with arbitrary grid spacing, which enables more flexible control of the shading rate in some embodiments.

In multi-rate shading, a coarse-rate shading phase is added on top of existing pixel-rate phase to significantly improve performance with minimum impact on image quality in some embodiments. Two shading phases, evaluated at different rates, may be mapped to one monolithic program running on processor graphics single instruction multiple data (SIMD) engines. A monolithic program is single-tiered software whose execution is not dependent on another program. In one embodiment, multi-rate shading allows a single rendering pass to execute shading code at one or more different rates: per group of pixels, per pixel, and per sample.

A new assembly instruction (interface to fixed function hardware accelerator) enables fast switching of program execution from coarse-rate to pixel-rate within same kernel program running on SIMD machine.

The new fixed-function logic accelerates coarse-to-pixel mapping, which has much lower complexity/cost than logic required to manage separate programs in some embodiments. At the same time, software overhead to use the new logic is minimal; thus it does not hinder performance of monolithic programs in some embodiments.

FIG. 1 illustrates an example of multi-rate shader execution for a coarse pixel quad layout of 1×2 pixels mapped to one SIMD program for different layouts of coarse pixels. A coarse pixel is a group of pixels that share the result of a single coarse pixel shader evaluation. FIG. 2 illustrates an example of multi-rate shader execution for a 2×2 coarse pixel quad layout. The diagrams show one 4-wide SIMD quad for simplicity, but this solution applies to any number quads mapped to wider SIMD machines. The numbers (0, 1, 2, 3) represent coarse pixels, while the capital letters (A, B, C, . . . ) represent pixels. The left side of each diagram illustrates a 2-dimensional view of pixels after rasterization, where numbers/letters in lighter text denote unlit pixels. The right side shows execution order of phases in a monolithic program on an SIMD machine.

In the first phase ("coarse phase"), all four SIMD lanes execute coarse-rate instructions for a coarse pixel quad. In the next phase (pixel phase #1), the same SIMD lanes are used to execute subsequent groups of pixel quads covered by the coarse quad. The set of pixel shader quads and their mapping to coarse pixels is dependent on both coarse pixel layout (e.g. 1×1, 1×2, 2×1, 2×2, 2×4, 4×2, 4×4) and rasterization mask (some quads may be completely unlit). Furthermore, the SIMD execution mask may be different for each group.

In phase one, with the first three pixels lit and the fourth pixel unlit, the execution mask is (1, 1, 1, 0), so that the unlit pixel is not executed. The coarse-to-pixel mapping for phase #1 is (0, 1, 0, 1) or coarse pixel 0 maps to pixel A, coarse pixel 1 maps to pixel B, pixel C also maps to coarse pixel 0 and pixel D maps to coarse pixel 1. For phase #2 the coarse-to-pixel mapping is 2, 3, 2, 3. All these pieces of information are unknown at shader compilation, which would contribute to significant software overhead, if coarse-to-pixel transition were implemented in software using an existing set of assembly instructions.

The execution sequences on the right in FIGS. 1 and 2 illustrate a monolithic program using a new assembly instruction (coarse-to-pixel-rate-switch) to reduce software overhead associated with phase transitions. The new instruction takes pixel group_id as an input, and for each pixel group it returns:

```
pixel_mask - indicating which pixels are lit in each group
pixel_to_coarse_mapping - indicating a parent coarse pixel for each pixel,
    (used to swizzle inter-phase data from coarse phase outputs)
pixel_rate_bary - pixel location in barycentric space to evaluate input attributes
next_group_id - identifier of next pixel group to process
```

The new instruction is an interface to the fixed function hardware accelerator. The accelerator determines 2-dimensional mapping of coarse quads to pixel quads and manages its variable expansion of this mapping, as the number of pixel quads to process varies both with coarse quad layout and rasterization mask. In particular, the accelerator suppresses entire quads if all pixels are unlit With this approach, a monolithic shader program abstracts from specific coarse quad layouts and mappings, and processes groups of pixels in a loop until the hardware accelerator informs processing is complete (next_group_id=0).

```
coarse_and_pixel_rate_shader(attribute_deltas, coarse_rate_bary)
{
    // regular shader code - same as in single-rate solution
    (simd) coarse_rate_inputs = interpolate(attribute_deltas,
    coarse_rate_bary)
    (simd) inter_phase_outputs = coarse_shader(coarse_rate_inputs)
    (1) group_id = 1
    (1) do {
        // pixel phase switching prolog - new
        (simd) (pixel_rate_bary, pixel_mask,
        pixel_to_coarse_mapping, next_group_id) =
            coarse-to-pixel-rate-switch(group_id)
        (simd) set_execution_mask(pixel_mask)
        (simd) inter_phase_inputs = swizzle(inter_phase_outputs,
        pixel_to_coarse_mapping)
        // regular pixel shader code - same as in single-rate solution
        (simd) pixel_rate_inputs = interpolate(attribute_deltas,
        pixel_rate_bary)
        (simd) pixel_rate_outputs = pixel_shader(pixel_rate_inputs,
        inter_phase_inputs)
        // pixel phase switching epilog - new
        group_id = next_gropu_id
    } unitl (group_id != 0)
}
```

In accordance with some embodiments, a single kernel runs programs for both coarse and pixel rate shading. In some embodiments the SIMD machine may be used in which the same lanes are used for both coarse and pixel quads covered by the coarse quads.

The sequence shown in FIG. 3A may be implemented in software, firmware and/or hardware. In software and firmware embodiments it may be implemented by computer executed instructions stored in one or more non-transitory computer readable media such as magnetic, optical or semiconductor storage.

The sequence of FIG. 3A, as indicated in block 10, a coarse phase is implemented for all groups or quads. This is followed in block 12 by the implementation of a pixel phase for each group using the coarse-to-pixel mapping and the execution mask so that the same SIMD lanes can be used to execute both coarse and pixel quads covered by the coarse quads.

Then the sequence receives a pixel group identifier (pixel group_id) (block 14) to identify a particular group of pixels such as a quad. The execution mask is set for the current pixel group (block 16) based on the pixel lit mask determined by the fixed function accelerator depicted in FIG. 3B. Then the coarse-to-pixel mapping is used to pass user-defined interstage data between corresponding coarse and pixel phases as indicated in block 18. The per-pixel input attribute values are determined and the pixel-rate shading phase is executed for each group at block 20. In block 22 the next group to process is identified.

In accordance with some embodiments, a fixed function accelerator may be implemented in software, firmware and/or hardware. In software and firmware embodiments the accelerator may be implemented by computer readable instructions stored in one or more non-transitory computer readable media such as magnetic, optical or semiconductor storages.

Figure 3B:
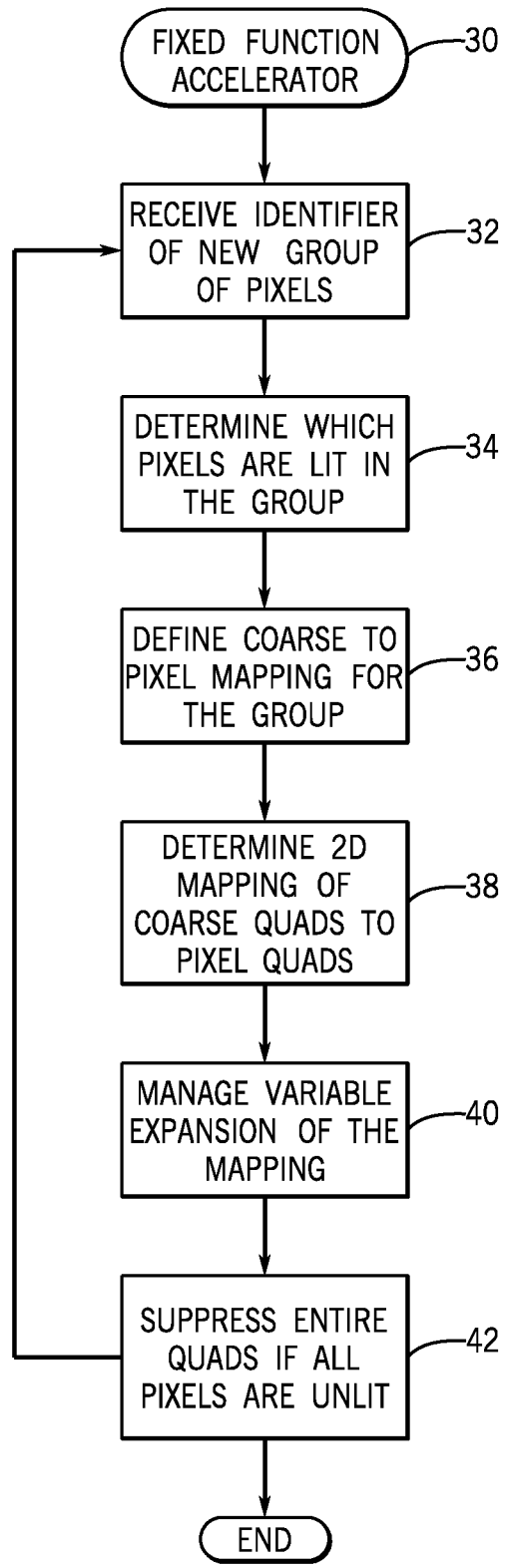
FIG. 3B is a flow chart for a fixed function accelerator according to one embodiment.

The sequence 30, shown in FIG. 3B, may begin by receiving an identifier of a new group of pixels as indicated in block 32. It determines two dimensional coarse-to-pixel mapping. On that basis, it determines a new group of pixels, managing variable expansion and suppression. For that quad it is determined which pixels are lit as indicated in block 34. Then the coarse the pixel mapping is defined for the group and the pixel locations and barycentric shape are determined in block 36. The 2D mapping of coarse pixels to pixel quads may be determined as indicated in block 38. Then the variable expansion of the mapping is managed as indicated in block 40. Finally entire quads are suppressed if all pixels are unlit as indicated in block 42. The flow continues to cycle as new groups of pixels are received. The accelerator returns the new group of pixels, their execution mask (block 16 of FIG. 3A) and the coarse-to-pixel mapping for this group (block 18 of FIG. 3A).

The unique interface and split of functionality between software (SIMD program) and hardware (fixed-function accelerator) enables efficient mapping of multi-rate shading phases onto one monolithic SIMD program in one embodiment. In one embodiment, this approach significantly reduces hardware complexity (logic, buffering) and does not compromise performance.

To allow shading at a rate lower than once per pixel, the notion of a coarse pixel (CP) is introduced. A CP is a group of $N_x \times N_y$ pixels, which will share the result of a single coarse pixel shader (CPS) evaluation. This is similar to how multiple visibility samples share a single pixel shader evaluation with MSAA, with the difference that the shading rate may be varied by varying the size of the CP. Groups of 2×2 CPs, called coarse quads (CQs), are shaded at a time to facilitate computing derivatives using finite differences.

Many applications can benefit from the ability to vary shading rates across different regions of the screen. To enable such variation in the shading rate, the screen may be divided into tiles of size $T_x \times T_y$, while allowing a different value of the CP size for each tile. Each tile maps to a shading grid of CQs, with the selected CP size.

A simplified decoupled sampling technique may be achieved by avoiding overlapping shading grids, which ensures that each pixel unambiguously belongs to only one CQ. This can be achieved by restricting the CP sizes to a finite set of values that ensure that the shading grid is perfectly aligned with the tile boundaries. With this assumption, the shading technique can be summarized as follows:

---
Algorithm 1 Simplified decoupled sampling with GPS.

---
for each primitive:
    for each covered tile on screen:
        Rasterize tile and store visible fragments
        Determine Nx , Ny for tile
        Divide tile into CQs of size 2Nx × 2Ny
        for each CQ with visible fragments:
            Shade CQ
            Write output color to all covered pixels

---

In order to ensure a perfectly aligned grid of CQs inside a tile, the CP sizes may be restricted such that the tile size is a common multiple (e.g., the least common multiple (LCM)) of all allowed CQ sizes.

A small number of modes that are easy to use, may control the CP size, yet those modes are powerful enough to support a range of applications. In each case, the user does not directly specify a CP size, but rather a pair of CP parameters $(s_x, s_y)$ that specifies the desired CP size. The CP parameters are then quantized to the closest available CP size that meets or exceeds the requested shading rate. Based on the selected mode, the CP parameters $(s_x, s_y)$ may be:
- interpolated from per-vertex shader outputs,
- set to a constant value using render state, or
- expressed as a radial function of screen coordinates.

Controlling the CP parameters with a shader output is highly flexible, and allows many use cases to be expressed.

Constant CP parameters may be enabled for simplicity. It is the least invasive method for adding CPS to an existing application. The ability to use a radial function is included specifically for foveated rendering. As a radial function cannot be robustly expressed using linear interpolation of per-vertex attributes, a separate mode may be used for this special case.

In order to always meet the required shading rate, the CP size, $N_x \times N_y$, is determined by computing conservative lower bounds for $|s_x|$ and $|s_y|$ within the tile, and rounding down to the nearest available CP size. The use of absolute values here enables use of negative CP parameters for motion and defocus blur.

There are two sources of quantization of CP sizes. First, the CP size is evaluated only once per tile. Second, the CP size is quantized to one of the finite available CP sizes. Both of these sources cause discontinuities in the CP sizes moving from tile to tile, which may result in visible tile transitions. To compensate for these discontinuities, the texture sampler level of detail (LOD) calculation is augmented to reflect the requested (un-quantized) CP size. This can be done by scaling the finite differences of texture coordinates that are used to compute the texture LOD:

$$\delta_x^{new} = \delta_x \frac{|s_x|}{N_x}, \delta_y^{new} = \delta_y \frac{|s_y|}{N_y},$$

where $\delta_x$ and $\delta_y$ are the finite differences of the texture coordinates along the x- and y-axes respectively. The values of $\delta_x$ and $\delta_y$ are evaluated for every CP, unlike the CP size which is evaluated once per tile. Compensating the texture LOD creates a smooth variation in image detail, which masks the discontinuities in the CP size.

Although LOD compensation can be effective in many cases, there are some scenarios where it might not be applicable, for example, with procedurally generated textures. In such cases, LOD compensation techniques can possibly be applied in user space, based on the CP size and CP parameters, which are available as shader inputs.

Shading may be executed at three different rates within the same rendering pass. Some of the shader computations can be moved to a lower rate than once per pixel, while certain high-frequency effects can be evaluated per pixel, or even per visibility sample to reduce aliasing. This is not possible in current graphics application program interfaces (APIs), as the pixel shader can be configured to run at pixel or sample rate, but the two are mutually exclusive. Conceptually, the single pixel shader stage of the graphics pipeline is divided into three distinct phases, one for each rate (see FIG. 2). Hence, after a tile is divided into coarse quads, each quad is shaded at one or more different rates: per-CP, per-pixel, and per-sample.

Figure 4:
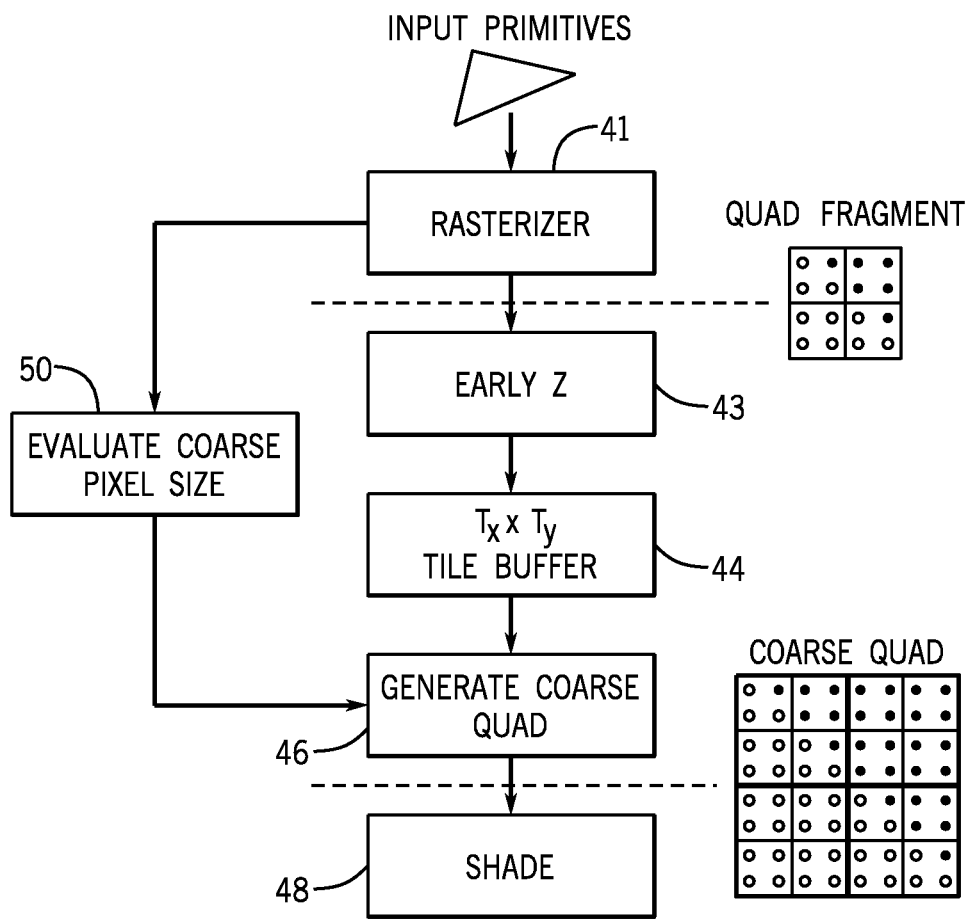
FIG. 4 is a pipeline abstraction of post-rasterization stages.

FIG. 4 illustrates how CPS can be integrated into an existing graphics pipeline. The rasterizer 41 tests input primitives to generate quad fragments, which are subjected to an early depth test (block 43) and then buffered in tile buffer 44, for every tile on the screen. The buffered fragments are mapped to coarse pixels and coarse quads in block 46, based on coarse pixel size (block 50), which are then shaded in block 48 and mapped into the output buffers. With a simplified decoupled sampling technique, rasterized samples for a given tile and primitive may be buffered in a tile buffer 44, and then the pixel shader 48 is invoked on complete CQs. The tile buffer retains the screen coordinates and all the necessary information to resolve visibility, such as depth values and coverage information. When a new tile or a new primitive is rasterized, the tile buffer is flushed, i.e., only a single tile's worth of data needs to be buffered.

Figure 5:
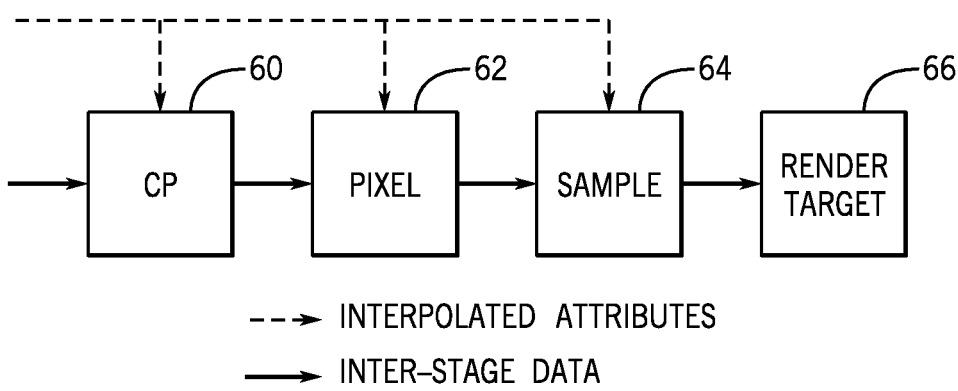
FIG. 5 depicts a portion of graphics pipeline for coarse pixel shading.

FIG. 5 illustrates how CPS and multi-rate shading are integrated into the pipeline abstraction of an existing graphics architecture like Direct3D 11 to produce render targets 66. Each shading phase has access to interpolated per-vertex attributes IA and a small amount of data may be communicated from one phase to the next through user-defined shader outputs; the amount of data allowed is an implementation-specific limit. Any of the phases (CP 60, pixel 62, sample 64) may also write outputs that will be consumed in later pipeline stages (e.g., framebuffer blending).

In multi-rate shading a low frequency diffuse term is computed per coarse pixel and a high frequency specular term is computed per pixel. The CP size is controlled through the vertex shader. In one embodiment a single conceptual pipeline stage may run a single shader compiled from up to three different entry points, one for each rate as shown below:

```
struct VS_OUT { // Output attributes
    float2 cpcize: SV_CoarsePixelSize;
};
VS_OUT VertexShader (VS_IN In){
    VS_OUT Out;
    Out.cpsize = ComputeCPSIZE (In)
    ...
    return Out;
}
[shadingphase ("coarse-pixel")]
[nextshaderfunc ("PixelShader")]
float 4 CoarseShader (VS_OUT In) {
    return ComputeDiffuse (In)
}
[shadingphase ("pixel")]
float 4 PixelShader (VS_OUT VSIn, float 4 CPIn) {
    return ComputeSpecular (VSIn, CPIn);
```

This approach provides programmers with a high degree of visibility into, and control over, what code runs at each rate, as well as what data flows between phases. The simpler models described above may still be implemented as layered abstractions in cases where control can be sacrificed for ease of use.

When CP size is being controlled by shader code, an additional system-interpreted value, SV_CoarsePixelSize, is made available to the last shading stage before the rasterizer. This output is a two-component vector, and corresponds to the CP parameters $(\delta_x, \delta_y)$. Typically this output will be set in a vertex shader, but could also be defined in a hull, domain, or geometry shader, if these are used.

In addition, shader code running at CP rate has access to inputs for both the interpolated values of the CP parameters before quantization, and the actual coarse pixel size: SV_RequestedCoarsePixelSize and SV_CoarsePixelSize, respectively. These two values together are sufficient for a shader to compute its own LOD compensation, for use in computations that do not involve the texture sampler (e.g., prefiltering a procedural texture).

There are several important use cases, where CPS can be used to significantly reduce the amount of pixel shading work. This is by no means an exhaustive list, as there are many more use cases.

Rendering to the native resolution of high-DPI displays is often a task too demanding for the graphics processing unit (GPU). The typical remedy is to lower the rendered resolution and upsample the image, which results in perceivable quality degradation along object silhouettes, while changes in surface interiors are not as apparent. Instead, by using CPS and setting the CP parameters to a constant value, such as 2×2 pixels, we can achieve a dramatic reduction of shading rate while retaining most detail.

With more flexible control over the shading rate, a wider range of applications may be enabled, as discussed below.

Some materials have lots of surface detail, while others do not. By choosing a CP parameter depending on the material type, computations can be saved where the visual impact is minimal. For instance, a particle system for rendering smoke may be rather homogeneous and shaded at a low rate, while a sign with text may warrant high resolution shading. Similarly, objects in full shadow may possibly be shaded at a lower rate than objects in bright sunlight.

CPS makes it easier to shade efficiently with foveated rendering, avoiding resending geometry over multiple rendering passes. A configurable radial function controls the shading rate with a few parameters: the point that corresponds to the center of the gaze, c, aspect ratio, a, inner and outer minor radii, $r^i$ and $r^o$, and inner and outer CP parameters, $s^{min}$ and $s^{max}$. For foveated rendering, $r^i$ may be set to a size representing a view angle of about 5°, and a=1 for a circular falloff function.

Although the shading system supports arbitrary positions for the high resolution region in some embodiments, merely fixing c at the center of the screen and using a wider aspect also produces good results, most notably when rendering from a first person perspective. This technique may be called peripheral CPS rendering, in contrast to proper foveated rendering, which is only possible with gaze tracking.

Regions of the screen with motion or defocus blur typically have a narrow frequency response and can be shaded at a lower rate. With CPS, one can control the shading rate in such regions by setting CP parameters in the vertex shader that are proportional to the screen space velocity or circle of confusion at that vertex. Since the vertex shader is evaluated before clipping, there may be vertices behind the camera or at zero depth. For such cases, shading rate is not reduced to ensure robustness.

The CP parameters can be determined separately for the x- and y-axes in order to generate anisotropic shading rates for motion blur. By assigning negative CP parameters for vertices in front of the focal plane and positive CP parameters for those behind, the CP parameters will interpolate to zero at the focal plane. Similarly, assigning signed CP parameters for velocity ensures zero values at stationary points inside a moving primitive. Since the screen space circle of confusion radius and velocity are linear functions in screen space, perspective-correct interpolation should be disabled for the CP parameter in such cases.

There are several different applications where multi-rate shading provides a valuable tool for scaling quality versus performance. High quality ambient occlusion term is computed every 2×2 pixels using voxel cone tracing while diffuse texture lookups are evaluated at a pixel rate to retain most of the surface detail. Similarly, complex low-frequency lighting computations, such as indirect lighting, can also be evaluated at a lower rate.

Another example is locally increasing the shading rate in difficult regions. This may be done to compute shading at a pixel or sample rate only around specular features, and lower elsewhere. It is fairly common for today's real-time workloads to implement a type of multi-rate shading using a two-pass approach. In this case, the first pass runs at pixel rate (MSAA), but discards difficult pixels which are marked in a stencil buffer. The second pass then runs shading per sample, but only for pixels marked in the stencil buffer. Using CPS, such algorithms can be converted to a single pass, which selectively computes the result in the pixel- and sample-rate shaders, executing results at even lower rates, where possible.

CPS multi-rate shading can also be used to perform culling on a per CP (e.g., 4×4 pixels) basis.

One CPS software implementation is a pipeline in a central processor based functional Direct3D 11 simulator. For this implementation, a tile size of 16×16 pixels and CP size widths and heights of 1, 2, or 4 may be used. In order to support the CPS programmer abstractions the DirectX High Level Shading Language is extended and new API functions may be introduced. The simulator may be instrumented to measure the dynamic instruction count, in order to give an indication of the cost of shading. All memory accesses to the color buffer may be tracked for measuring color bandwidth.

In addition to pixel shading, a coarse pixel (CP) as well as a sample rate shading phase may be introduced in the pipeline. There are several potential implementation strategies for multi-rate shading depending on how these additional phases are scheduled across multiple processors and threads. In a scheduling strategy, the CP, pixel, and sample rate shading phases are executed consecutively on the same thread. Restricting the schedule in this manner enables a simple implementation, which requires significantly fewer changes to the pipeline. It eliminates the need to transport data across phases since the data can reside in the same registers. It also avoids complex flow control mechanisms for throttling inter-phase data.

Figure 6:
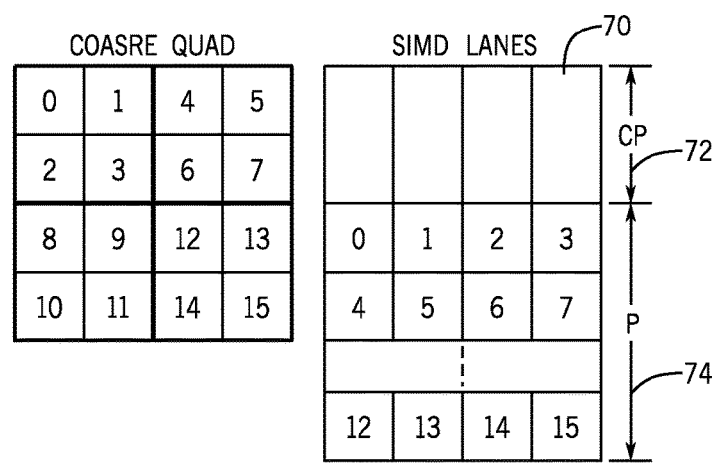
FIG. 6 depicts multi-rate shading with a coarse pixel quad scheduled in a single thread on a 4-wide SIMD processor.

FIG. 6 shows a coarse quad with a CP size of 2×2 scheduled on a 4-wide SIMD processor having lanes 70. First, the four CPs in the coarse quad (e.g. 0123, 4567, . . . 12131415) are executed concurrently at 72 across the SIMD lanes which facilitates computing of finite differences. Following the coarse phase, the processor concurrently schedules 2×2 pixel quads at 74 inside the coarse quad, looping over all covered quads. Since this scheduling scheme requires movement of data across SIMD lanes when transitioning across phases, we assume the availability of processor instructions to facilitate this in an efficient manner.

For SIMD widths greater than 4 (say 8 or 12), multiple coarse quads may be scheduled concurrently. However, since each coarse quad can have a different number of covered pixels, a higher SIMD width can also lead to a reduced utilization of some SIMD lanes as some pixel phase loops terminate early. For improved efficiency with large SIMD widths, one may choose a more optimal scheduling scheme that distributes the pixel phase work more evenly across SIMD lanes or even separate threads.

Shading at a lower rate than once per pixel has implications for how well color buffer compression works to reduce the memory bandwidth. A higher degree of uniformity in color values within 2×2 or larger pixel blocks generally reduces the entropy and makes compression more efficient. There are many existing methods for color compression that can benefit from CPS. To illustrate that this works in practice, the scheme by Pool et al, which computes color differences between pixels, and then applies entropy coding over the differences using a Fibonacci encoder may be used. Pool, et al., "Lossless Compression of Variable Precision Floating-Point Buffers on GPUs," Symposium on Interactive 3D Graphics and Games (2012), pp. 47-54.

Pool et al.'s scheme may be modified so that the pixels are always visited in a hierarchical manner using a predefined Hilbert curve. As a consequence, the differences will first be computed inside a 2×2 quad, and then inside a 4×4 region, and so on. When CPS is enabled, several colors inside some of these regions are likely to be the same, producing zero differences, which are efficiently encoded using a Fibonacci encoder. We use a cache line size of 128 bytes, equivalent to 8×4 pixels for an RGBA8 render target. When a line is evicted from the color cache, it is compressed, and if the resulting size is less than or equal to 64 bytes, compression is successful, and the line is marked as compressed in a separate control buffer and send only one 64 byte transaction to memory. Otherwise, the uncompressed data is sent to memory in two 64 byte transactions. A 64 kB color cache is modeled with an least recently used (LRU) replacement policy.

Coarse pixel shading (CPS) can significantly reduce the cost of shading with little to no perceivable impact on image quality. CPS fits naturally in the evolution of the real-time graphics pipeline as it introduces a new degree of flexibility through programmable shading rates, while still addressing a real need for energy efficiency for the fast growing market of hand-held devices.

Figure 7:
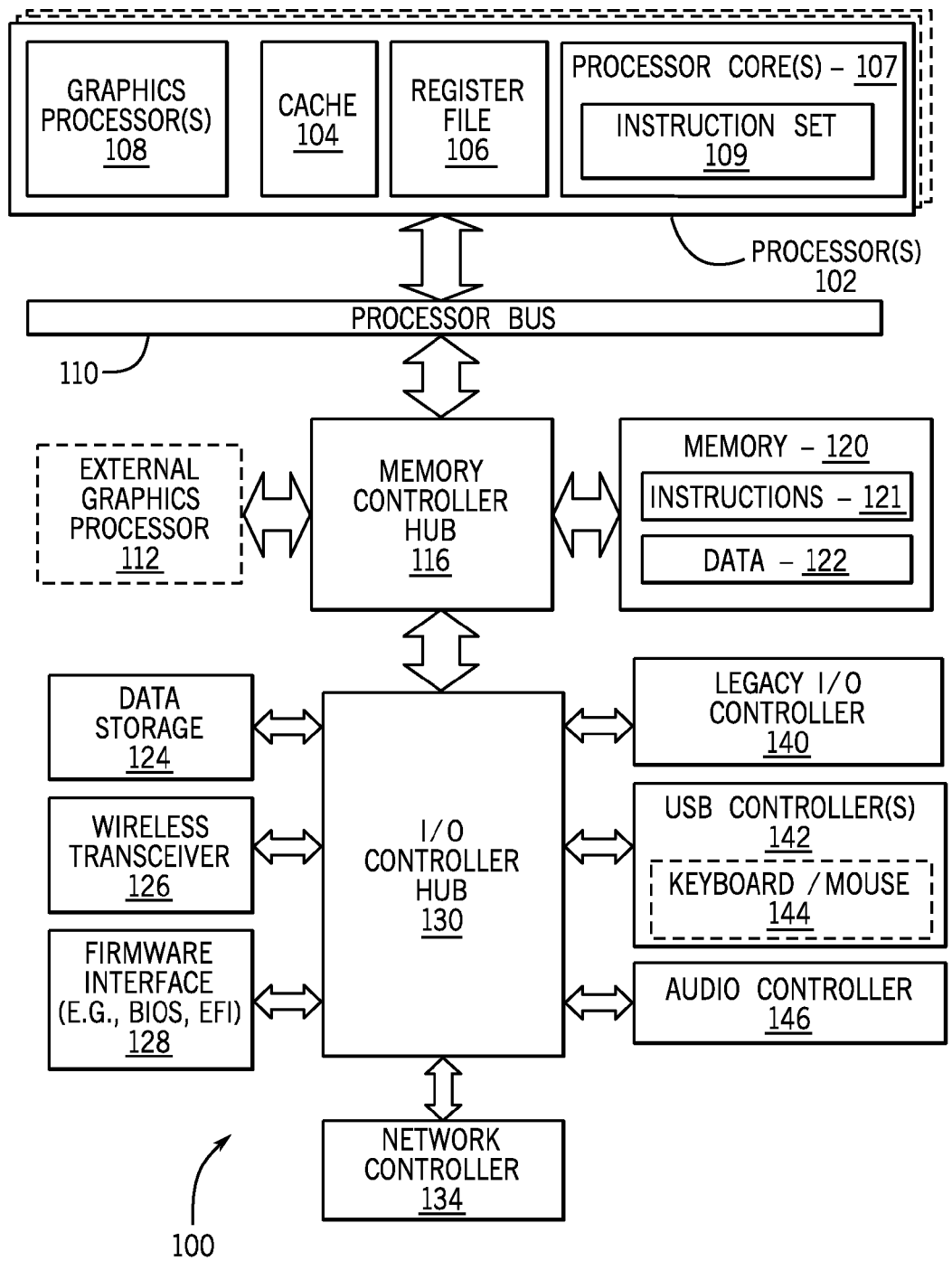
FIG. 7 is a block diagram of a data processing system according to one embodiment.

FIG. 7 is a block diagram of a data processing system 100, according to an embodiment. The data processing system 100 includes one or more processors 102 and one or more graphics processors 108, and may be a single processor desktop system, a multiprocessor workstation system, or a server system having a large number of processors 102 or processor cores 107. In on embodiment, the data processing system 100 is a system on a chip integrated circuit (SOC) for use in mobile, handheld, or embedded devices.

An embodiment of the data processing system 100 can include, or be incorporated within a server-based gaming platform, a game console, including a game and media console, a mobile gaming console, a handheld game console, or an online game console. In one embodiment, the data processing system 100 is a mobile phone, smart phone, tablet computing device or mobile Internet device. The data processing system 100 can also include, couple with, or be integrated within a wearable device, such as a smart watch wearable device, smart eyewear device, augmented reality device, or virtual reality device. In one embodiment, the data processing system 100 is a television or set top box device having one or more processors 102 and a graphical interface generated by one or more graphics processors 108.

The one or more processors 102 each include one or more processor cores 107 to process instructions which, when executed, perform operations for system and user software. In one embodiment, each of the one or more processor cores 107 is configured to process a specific instruction set 109. The instruction set 109 may facilitate complex instruction set computing (CISC), reduced instruction set computing (RISC), or computing via a very long instruction word (VLIW). Multiple processor cores 107 may each process a different instruction set 109 which may include instructions to facilitate the emulation of other instruction sets. A processor core 107 may also include other processing devices, such a digital signal processor (DSP).

In one embodiment, the processor 102 includes cache memory 104. Depending on the architecture, the processor 102 can have a single internal cache or multiple levels of internal cache. In one embodiment, the cache memory is shared among various components of the processor 102. In one embodiment, the processor 102 also uses an external cache (e.g., a Level 3 (L3) cache or last level cache (LLC)) (not shown) which may be shared among the processor cores 107 using known cache coherency techniques. A register file 106 is additionally included in the processor 102 which may include different types of registers for storing different types of data (e.g., integer registers, floating point registers, status registers, and an instruction pointer register). Some registers may be general-purpose registers, while other registers may be specific to the design of the processor 102.

The processor 102 is coupled to a processor bus 110 to transmit data signals between the processor 102 and other components in the system 100. The system 100 uses an exemplary 'hub' system architecture, including a memory controller hub 116 and an input output (I/O) controller hub 130. The memory controller hub 116 facilitates communication between a memory device and other components of the system 100, while the I/O controller hub (ICH) 130 provides connections to I/O devices via a local I/O bus.

The memory device 120, can be a dynamic random access memory (DRAM) device, a static random access memory (SRAM) device, flash memory device, or some other memory device having suitable performance to serve as process memory. The memory 120 can store data 122 and instructions 121 for use when the processor 102 executes a process. The memory controller hub 116 also couples with an optional external graphics processor 112, which may communicate with the one or more graphics processors 108 in the processors 102 to perform graphics and media operations.

The ICH 130 enables peripherals to connect to the memory 120 and processor 102 via a high-speed I/O bus. The I/O peripherals include an audio controller 146, a firmware interface 128, a wireless transceiver 126 (e.g., Wi-Fi, Bluetooth), a data storage device 124 (e.g., hard disk drive, flash memory, etc.), and a legacy I/O controller for coupling legacy (e.g., Personal System 2 (PS/2)) devices to the system. One or more Universal Serial Bus (USB) controllers 142 connect input devices, such as keyboard and mouse 144 combinations. A network controller 134 may also couple to the ICH 130. In one embodiment, a high-performance network controller (not shown) couples to the processor bus 110.

Figure 8:
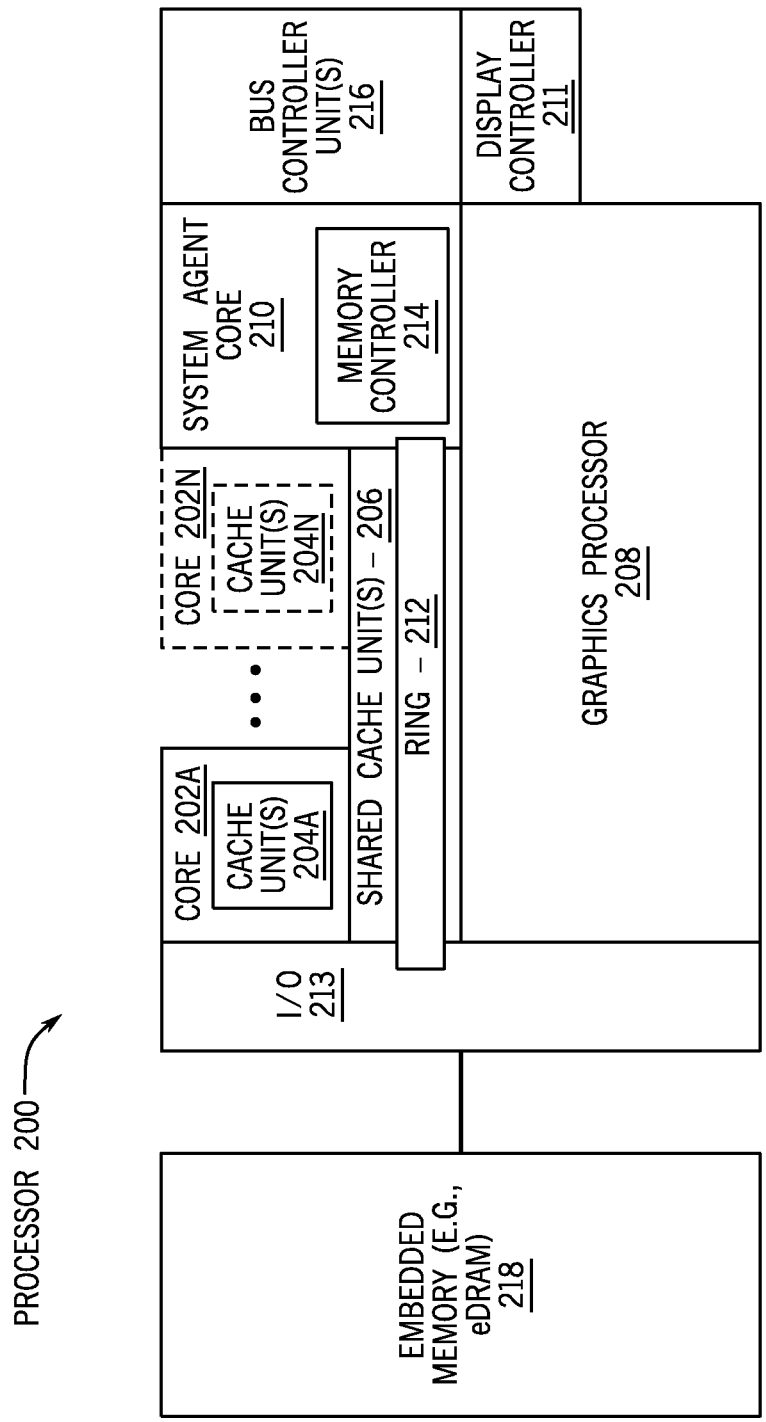
FIG. 8 is a block diagram of the processor shown in FIG. 7 according to one embodiment.

FIG. 8 is a block diagram of an embodiment of a processor 200 having one or more processor cores 202A-N, an integrated memory controller 214, and an integrated graphics processor 208. The processor 200 can include additional cores up to and including additional core 202N represented by the dashed lined boxes. Each of the cores 202A-N includes one or more internal cache units 204A-N. In one embodiment each core also has access to one or more shared cached units 206.

The internal cache units 204A-N and shared cache units 206 represent a cache memory hierarchy within the processor 200. The cache memory hierarchy may include at least one level of instruction and data cache within each core and one or more levels of shared mid-level cache, such as a level 2 (L2), level 3 (L3), level 4 (L4), or other levels of cache, where the highest level of cache before external memory is classified as the last level cache (LLC). In one embodiment, cache coherency logic maintains coherency between the various cache units 206 and 204A-N.

The processor 200 may also include a set of one or more bus controller units 216 and a system agent 210. The one or more bus controller units manage a set of peripheral buses, such as one or more Peripheral Component Interconnect buses (e.g., PCI, PCI Express). The system agent 210 provides management functionality for the various processor components. In one embodiment, the system agent 210 includes one or more integrated memory controllers 214 to manage access to various external memory devices (not shown).

In one embodiment, one or more of the cores 202A-N include support for simultaneous multi-threading. In such embodiment, the system agent 210 includes components for coordinating and operating cores 202A-N during multi-threaded processing. The system agent 210 may additionally include a power control unit (PCU), which includes logic and components to regulate the power state of the cores 202A-N and the graphics processor 208.

The processor 200 additionally includes a graphics processor 208 to execute graphics processing operations. In one embodiment, the graphics processor 208 couples with the set of shared cache units 206, and the system agent unit 210, including the one or more integrated memory controllers 214. In one embodiment, a display controller 211 is coupled with the graphics processor 208 to drive graphics processor output to one or more coupled displays. The display controller 211 may be separate module coupled with the graphics processor via at least one interconnect, or may be integrated within the graphics processor 208 or system agent 210.

In one embodiment a ring based interconnect unit 212 is used to couple the internal components of the processor 200, however an alternative interconnect unit may be used, such as a point to point interconnect, a switched interconnect, or other techniques, including techniques well known in the art. In one embodiment, the graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In one embodiment each of the cores 202-N and the graphics processor 208 use the embedded memory modules 218 as shared last level cache.

In one embodiment cores 202A-N are homogenous cores executing the same instruction set architecture. In another embodiment, the cores 202A-N are heterogeneous in terms of instruction set architecture (ISA), where one or more of the cores 202A-N execute a first instruction set, while at least one of the other cores executes a subset of the first instruction set or a different instruction set.

The processor 200 can be a part of or implemented on one or more substrates using any of a number of process technologies, for example, Complementary metal-oxide-semiconductor (CMOS), Bipolar Junction/Complementary metal-oxide-semiconductor (BiCMOS) or N-type metal-oxide-semiconductor logic (NMOS). Additionally, the processor 200 can be implemented on one or more chips or as a system on a chip (SOC) integrated circuit having the illustrated components, in addition to other components.

Figure 9:
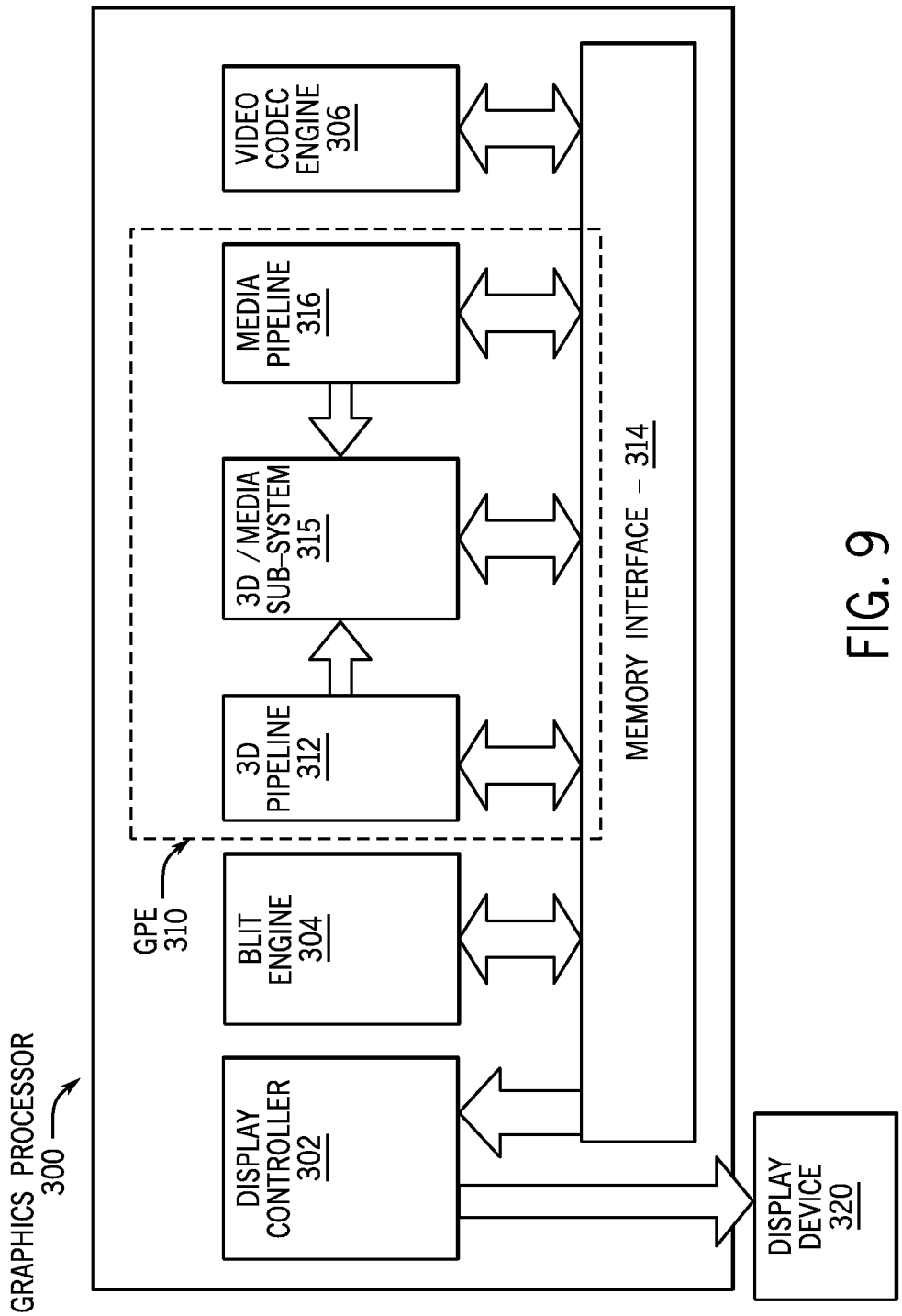
FIG. 9 is a block diagram of the graphics processor of FIG. 7 according to one embodiment.

FIG. 9 is a block diagram of one embodiment of a graphics processor 300 which may be a discreet graphics processing unit, or may be graphics processor integrated with a plurality of processing cores. In one embodiment, the graphics processor is communicated with via a memory mapped I/O interface to registers on the graphics processor and via commands placed into the processor memory. The graphics processor 300 includes a memory interface 314 to access memory. The memory interface 314 can be an interface to local memory, one or more internal caches, one or more shared external caches, and/or to system memory.

The graphics processor 300 also includes a display controller 302 to drive display output data to a display device 320. The display controller 302 includes hardware for one or more overlay planes for the display and composition of multiple layers of video or user interface elements. In one embodiment the graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421 M/VC-1, and Joint Photographic Experts Group (JPEG) formats such as JPEG, and Motion JPEG (MJPEG) formats.

In one embodiment, the graphics processor 300 includes a block image transfer (BLIT) engine 304 to perform two-dimensional (2D) rasterizer operations including, for example, bit-boundary block transfers. However, in one embodiment, 2D graphics operations are performed using one or more components of the graphics-processing engine (GPE) 310. The graphics-processing engine 310 is a compute engine for performing graphics operations, including three-dimensional (3D) graphics operations and media operations.

The GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While the 3D pipeline 312 can be used to perform media operations, an embodiment of the GPE 310 also includes a media pipeline 316 that is specifically used to perform media operations, such as video post processing and image enhancement.

In one embodiment, the media pipeline 316 includes fixed function or programmable logic units to perform one or more specialized media operations, such as video decode acceleration, video de-interlacing, and video encode acceleration in place of, or on behalf of the video codec engine 306. In on embodiment, the media pipeline 316 additionally includes a thread spawning unit to spawn threads for execution on the 3D/Media sub-system 315. The spawned threads perform computations for the media operations on one or more graphics execution units included in the 3D/Media sub-system.

The 3D/Media subsystem 315 includes logic for executing threads spawned by the 3D pipeline 312 and media pipeline 316. In one embodiment, the pipelines send thread execution requests to the 3D/Media subsystem 315, which includes thread dispatch logic for arbitrating and dispatching the various requests to available thread execution resources. The execution resources include an array of graphics execution units to process the 3D and media threads. In one embodiment, the 3D/Media subsystem 315 includes one or more internal caches for thread instructions and data. In one embodiment, the subsystem also includes shared memory, including registers and addressable memory, to share data between threads and to store output data.

Figure 10:
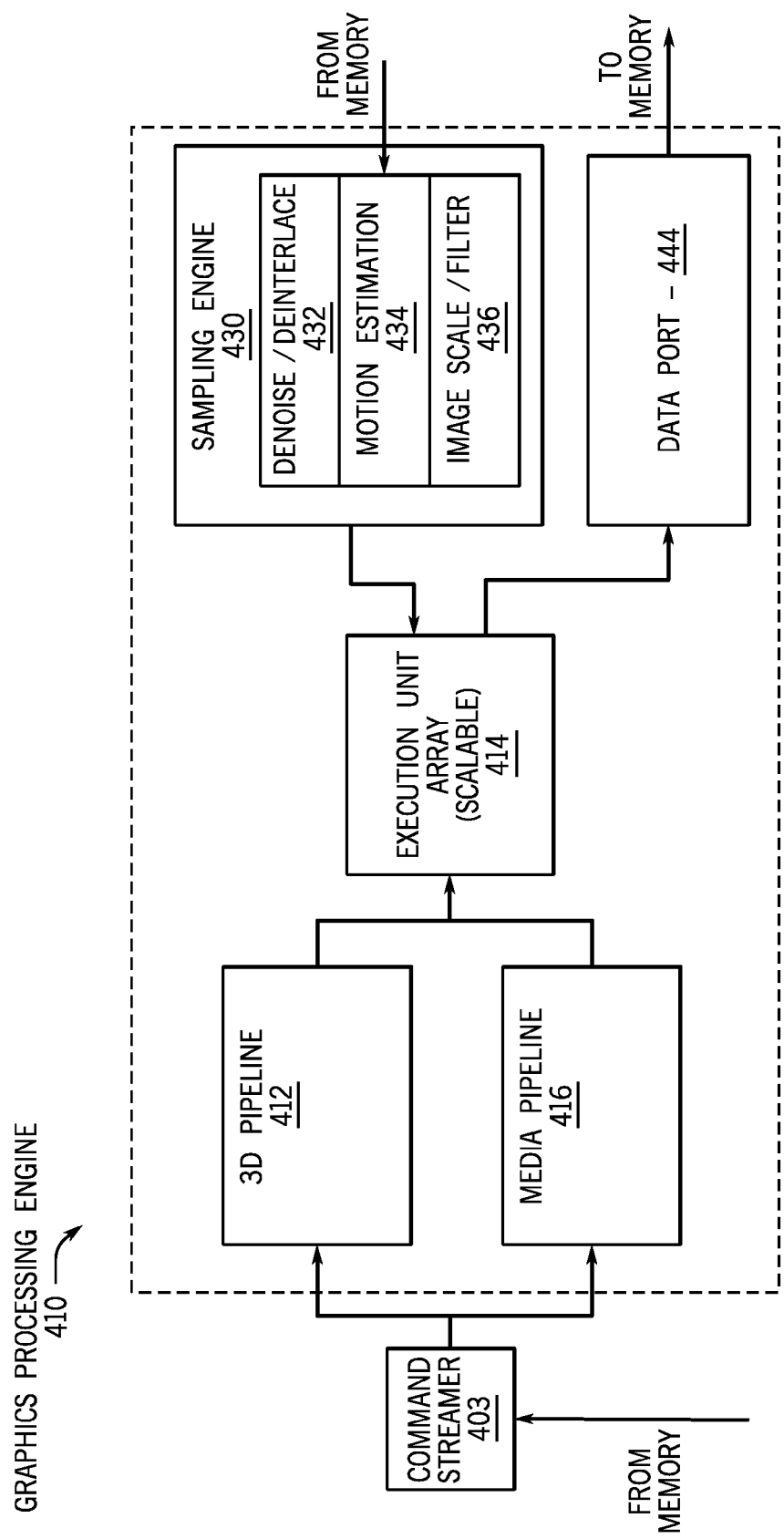
FIG. 10 is a block diagram of a graphics processing engine according to one embodiment.

FIG. 10 is a block diagram of an embodiment of a graphics processing engine 410 for a graphics processor. In one embodiment, the graphics processing engine (GPE) 410 is a version of the GPE 310 shown in FIG. 9. The GPE 410 includes a 3D pipeline 412 and a media pipeline 416, each of which can be either different from or similar to the implementations of the 3D pipeline 312 and the media pipeline 316 of FIG. 9.

In one embodiment, the GPE 410 couples with a command streamer 403, which provides a command stream to the GPE 3D and media pipelines 412, 416. The command streamer 403 is coupled to memory, which can be system memory, or one or more of internal cache memory and shared cache memory. The command streamer 403 receives commands from the memory and sends the commands to the 3D pipeline 412 and/or media pipeline 416. The 3D and media pipelines process the commands by performing operations via logic within the respective pipelines or by dispatching one or more execution threads to the execution unit array 414. In one embodiment, the execution unit array 414 is scalable, such that the array includes a variable number of execution units based on the target power and performance level of the GPE 410.

A sampling engine 430 couples with memory (e.g., cache memory or system memory) and the execution unit array 414. In one embodiment, the sampling engine 430 provides a memory access mechanism for the scalable execution unit array 414 that allows the execution array 414 to read graphics and media data from memory. In one embodiment, the sampling engine 430 includes logic to perform specialized image sampling operations for media.

The specialized media sampling logic in the sampling engine 430 includes a de-noise/de-interlace module 432, a motion estimation module 434, and an image scaling and filtering module 436. The de-noise/de-interlace module 432 includes logic to perform one or more of a de-noise or a de-interlace algorithm on decoded video data. The de-interlace logic combines alternating fields of interlaced video content into a single fame of video. The de-noise logic reduces or remove data noise from video and image data. In one embodiment, the de-noise logic and de-interlace logic are motion adaptive and use spatial or temporal filtering based on the amount of motion detected in the video data. In one embodiment, the de-noise/de-interlace module 432 includes dedicated motion detection logic (e.g., within the motion estimation engine 434).

The motion estimation engine 434 provides hardware acceleration for video operations by performing video acceleration functions such as motion vector estimation and prediction on video data. The motion estimation engine determines motion vectors that describe the transformation of image data between successive video frames. In one embodiment, a graphics processor media codec uses the video motion estimation engine 434 to perform operations on video at the macro-block level that may otherwise be computationally intensive to perform using a general-purpose processor. In one embodiment, the motion estimation engine 434 is generally available to graphics processor components to assist with video decode and processing functions that are sensitive or adaptive to the direction or magnitude of the motion within video data.

The image scaling and filtering module 436 performs image-processing operations to enhance the visual quality of generated images and video. In one embodiment, the scaling and filtering module 436 processes image and video data during the sampling operation before providing the data to the execution unit array 414.

In one embodiment, the graphics processing engine 410 includes a data port 444, which provides an additional mechanism for graphics subsystems to access memory. The data port 444 facilitates memory access for operations including render target writes, constant buffer reads, scratch memory space reads/writes, and media surface accesses. In one embodiment, the data port 444 includes cache memory space to cache accesses to memory. The cache memory can be a single data cache or separated into multiple caches for the multiple subsystems that access memory via the data port (e.g., a render buffer cache, a constant buffer cache, etc.). In one embodiment, threads executing on an execution unit in the execution unit array 414 communicate with the data port by exchanging messages via a data distribution interconnect that couples each of the sub-systems of the graphics processing engine 410.

Figure 11:
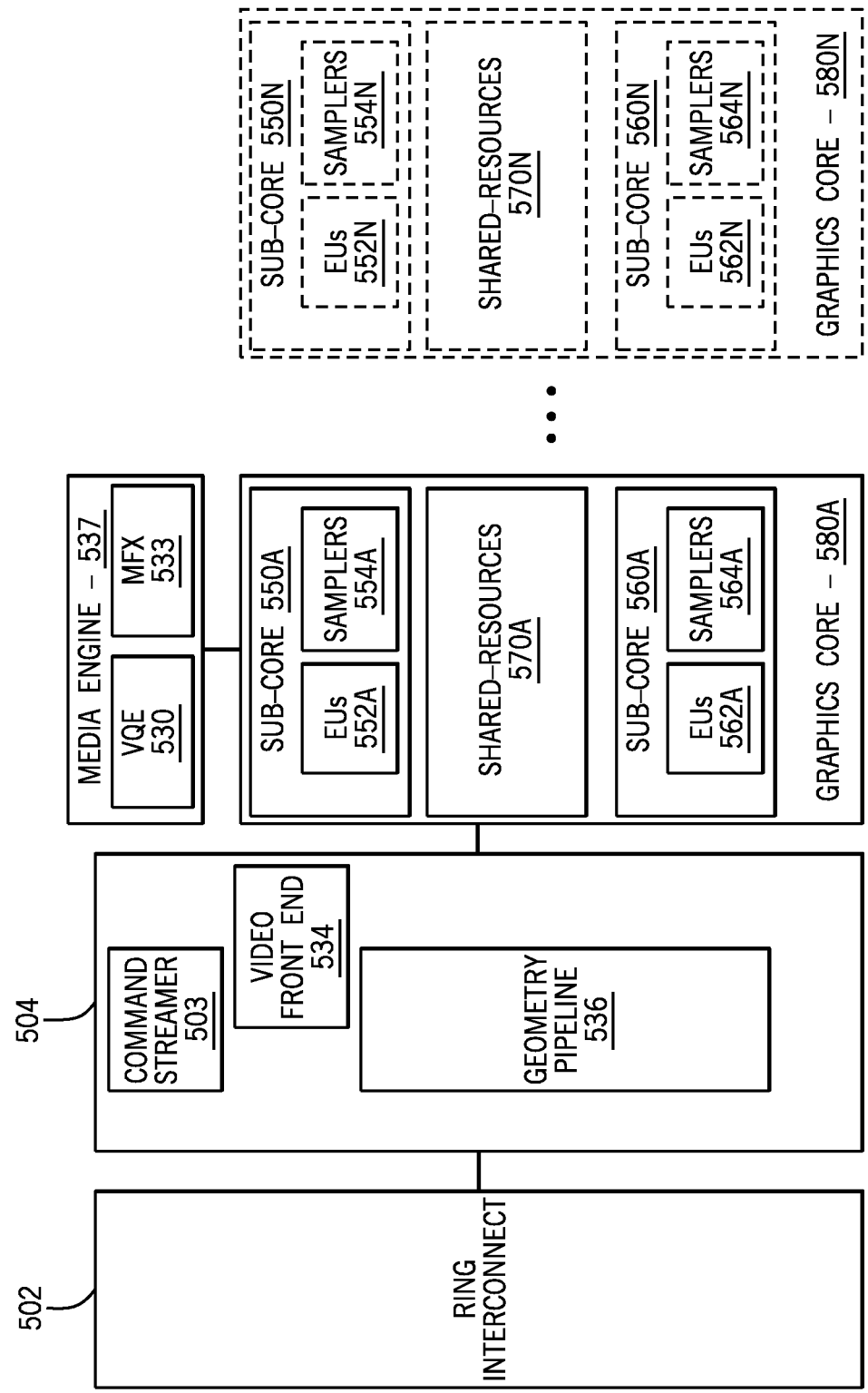
FIG. 11 is a block diagram of a graphics processor according to another embodiment.

FIG. 11 is a block diagram of another embodiment of a graphics processor. In one embodiment, the graphics processor includes a ring interconnect 502, a pipeline front-end 504, a media engine 537, and graphics cores 580A-N. The ring interconnect 502 couples the graphics processor to other processing units, including other graphics processors or one or more general-purpose processor cores. In one embodiment, the graphics processor is one of many processors integrated within a multi-core processing system.

The graphics processor receives batches of commands via the ring interconnect 502. The incoming commands are interpreted by a command streamer 503 in the pipeline front-end 504. The graphics processor includes scalable execution logic to perform 3D geometry processing and media processing via the graphics core(s) 580A-N. For 3D geometry processing commands, the command streamer 503 supplies the commands to the geometry pipeline 536. For at least some media processing commands, the command streamer 503 supplies the commands to a video front end 534, which couples with a media engine 537. The media engine 537 includes a video quality engine (VQE) 530 for video and image post processing and a multi-format encode/decode (MFX) 533 engine to provide hardware-accelerated media data encode and decode. The geometry pipeline 536 and media engine 537 each generate execution threads for the thread execution resources provided by at least one graphics core 580A.

The graphics processor includes scalable thread execution resources featuring modular cores 580A-N (sometime referred to as core slices), each having multiple sub-cores 550A-N, 560A-N (sometimes referred to as core sub-slices). The graphics processor can have any number of graphics cores 580A through 580N. In one embodiment, the graphics processor includes a graphics core 580A having at least a first sub-core 550A and a second core sub-core 560A. In another embodiment, the graphics processor is a low power processor with a single sub-core (e.g., 550A). In one embodiment, the graphics processor includes multiple graphics cores 580A-N, each including a set of first sub-cores 550A-N and a set of second sub-cores 560A-N. Each sub-core in the set of first sub-cores 550A-N includes at least a first set of execution units 552A-N and media/texture samplers 554A-N. Each sub-core in the set of second sub-cores 560A-N includes at least a second set of execution units 562A-N and samplers 564A-N. In one embodiment, each sub-core 550A-N, 560A-N shares a set of shared resources 570A-N. In one embodiment, the shared resources include shared cache memory and pixel operation logic. Other shared resources may also be included in the various embodiments of the graphics processor.

Figure 12:
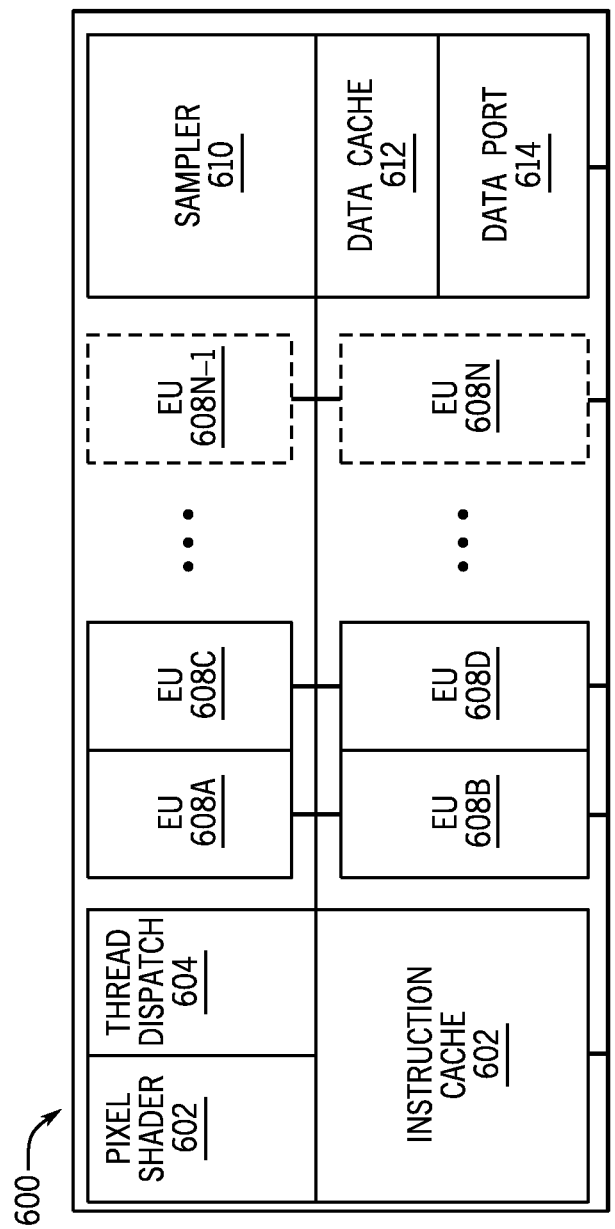
FIG. 12 illustrates thread execution logic for one embodiment.

FIG. 12 illustrates thread execution logic 600 including an array of processing elements employed in one embodiment of a graphics processing engine. In one embodiment, the thread execution logic 600 includes a thread dispatcher 604, instruction cache 606, a scalable execution unit array including a plurality of execution units 608A-N, a sampler 610, a data cache 612, and a data port 614. In one embodiment the included components are interconnected via an interconnect fabric that links to each of the components. The thread execution logic 600 includes one or more connections to memory, such as system memory or cache memory, through one or more of the instruction cache 606, the data port 614, the sampler 610, and the execution unit array 608A-N. In one embodiment, each execution unit (e.g. 608A) is an individual vector processor capable of executing multiple simultaneous threads and processing multiple data elements in parallel for each thread. The execution unit array 608A-N includes any number individual execution units.

In one embodiment, the execution unit array 608A-N is primarily used to execute "shader" programs. In one embodiment, the execution units in the array 608A-N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in the execution unit array 608A-N operates on arrays of data elements. The number of data elements is the "execution size," or the number of channels for the instruction. An execution channel is a logical unit of execution for data element access, masking, and flow control within instructions. The number of channels may be independent of the number of physical ALUs or FPUs for a particular graphics processor. The execution units 608A-N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (quad-word (QW) size data elements), eight separate 32-bit packed data elements (double word (DW) size data elements), sixteen separate 16-bit packed data elements (word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In one embodiment, one or more data caches (e.g., 612) are included to cache thread data during thread execution. A sampler 610 is included to provide texture sampling for 3D operations and media sampling for media operations. In one embodiment, the sampler 610 includes specialized texture or media sampling functionality to process texture or media data during the sampling process before providing the sampled data to an execution unit.

During execution, the graphics and media pipelines send thread initiation requests to the thread execution logic 600 via thread spawning and dispatch logic. The thread execution logic 600 includes a local thread dispatcher 604 that arbitrates thread initiation requests from the graphics and media pipelines and instantiates the requested threads on one or more execution units 608A-N. For example, the geometry pipeline (e.g., 536 of FIG. 10) dispatches vertex processing, tessellation, or geometry processing threads to the thread execution logic 600. The thread dispatcher 604 can also process runtime thread spawning requests from the executing shader programs.

Once a group of geometric objects have been processed and rasterized into pixel data, the pixel shader 602 is invoked to further compute output information and cause results to be written to output surfaces (e.g., color buffers, depth buffers, stencil buffers, etc.). In one embodiment, the pixel shader 602 calculates the values of the various vertex attributes that are to be interpolated across the rasterized object. The pixel shader 602 then executes an API-supplied pixel shader program. To execute the pixel shader program, the pixel shader 602 dispatches threads to an execution unit (e.g., 608A) via the thread dispatcher 604. The pixel shader 602 uses texture sampling logic in the sampler 610 to access texture data in texture maps stored in memory. Arithmetic operations on the texture data and the input geometry data compute pixel color data for each geometric fragment, or discards one or more pixels from further processing.

In one embodiment, the data port 614 provides a memory access mechanism for the thread execution logic 600 output processed data to memory for processing on a graphics processor output pipeline. In one embodiment, the data port 614 includes or couples to one or more cache memories (e.g., data cache 612) to cache data for memory access via the data port.

Figure 13:
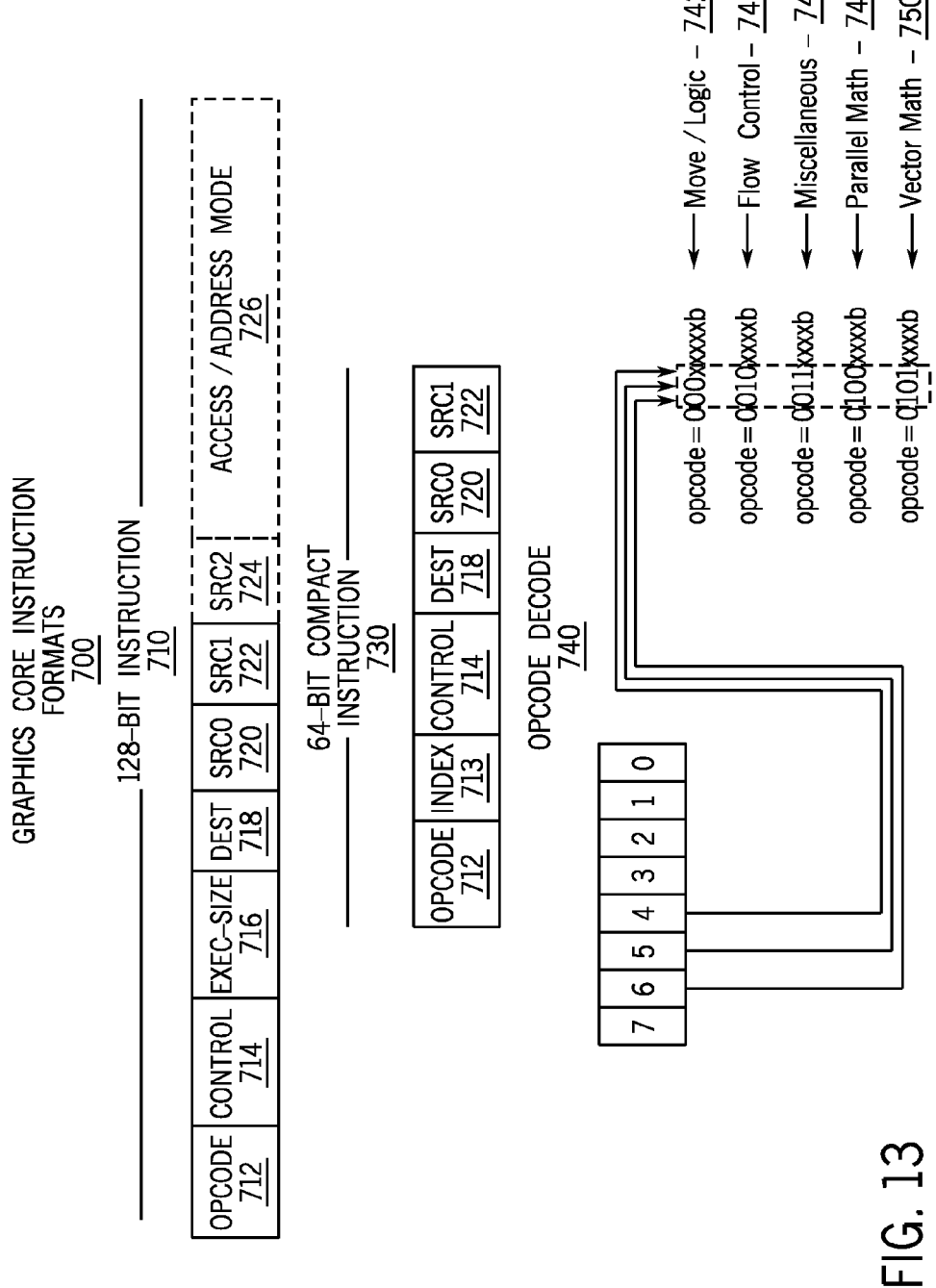
FIG. 13 is a block diagram of a graphics processor execution unit instruction format according to one embodiment.

FIG. 13 is a block diagram illustrating a graphics processor execution unit instruction format according to an embodiment. Access to the fixed function accelerator described earlier may be mapped to an instruction (send message) described here. In one embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. The instruction format described an illustrated are macro-instructions, in that they are instructions supplied to the execution unit, as opposed to micro-operations resulting from instruction decode once the instruction is processed.

In one embodiment, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 varies by embodiment. In one embodiment, the instruction is compacted in part using a set of index values in an index field 713. The execution unit hardware references a set of compaction tables based on the index values and uses the compaction table outputs to reconstruct a native instruction in the 128-bit format 710.

For each format, an instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. An instruction control field 712 enables control over certain execution options, such as channels selection (e.g., predication) and data channel order (e.g., swizzle). For 128-bit instructions 710 an exec-size field 716 limits the number of data channels that will be executed in parallel. The exec-size field 716 is not available for use in the 64-bit compact instruction format 730.

Some execution unit instructions have up to three operands including two source operands, src0 720, src1 722, and one destination 718. In one embodiment, the execution units support dual destination instructions, where one of the destinations is implied. Data manipulation instructions can have a third source operand (e.g., SRC2 724), where the instruction opcode JJ12 determines the number of source operands. An instruction's last source operand can be an immediate (e.g., hard-coded) value passed with the instruction.

In one embodiment instructions are grouped based on opcode bit-fields to simplify Opcode decode 740. For an 8-bit opcode, bits 4, 5, and 6 allow the execution unit to determine the type of opcode. The precise opcode grouping shown is exemplary. In one embodiment, a move and logic opcode group 742 includes data movement and logic instructions (e.g., mov, cmp). The move and logic group 742 shares the five most significant bits (MSB), where move instructions are in the form of 0000xxxxb (e.g., 0x0x) and logic instructions are in the form of 0001xxxxb (e.g., 0x01). A flow control instruction group 744 (e.g., call, jmp) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, mul) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Figure 14:
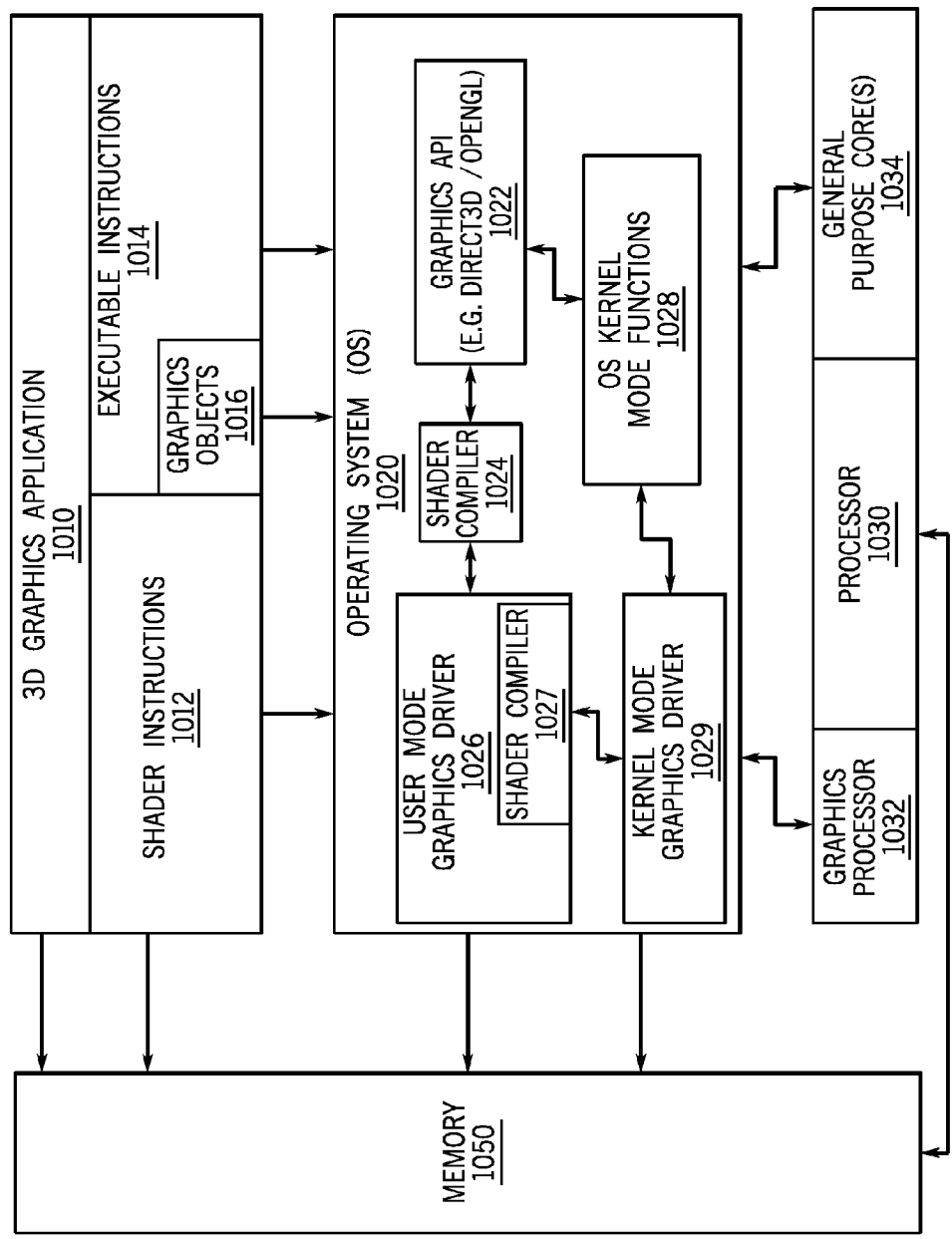
FIG. 14 is a graphics software architecture for one embodiment.

FIG. 14 illustrates exemplary graphics software architecture for a data processing system according to an embodiment. The software architecture includes a 3D graphics application 1010, an operating system 1020, and at least one processor 1030. The processor 1030 includes a graphics processor 1032 and one or more general-purpose processor core(s) 1034. The graphics application 1010 and operating system 1020 each execute in the system memory 1050 of the data processing system.

In one embodiment, the 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

The operating system 1020 may be a Microsoft® Windows® operating system from the Microsoft Corporation, a proprietary UNIX-like operating system, or an open source UNIX-like operating system using a variant of the Linux kernel. When the Direct3D API is in use, the operating system 1020 uses a front-end shader compiler 1024 to compile any shader instructions 1012 in HLSL into a lower-level shader language. The compilation may be a just-in-time compilation or the application can perform share pre-compilation. In one embodiment, high-level shaders are compiled into low-level shaders during the compilation of the 3D graphics application 1010.

The user mode graphics driver 1026 may contain a back-end shader compiler 1027 to convert the shader instructions 1012 into a hardware specific representation. The shader compiler fuses coarse- and pixel-rate phases into one monolithic program and adds 'glue code' around as described in connection with the earlier monolithic program description. When the OpenGL API is in use, shader instructions 1012 in the GLSL high-level language are passed to a user mode graphics driver 1026 for compilation. The user mode graphics driver uses operating system kernel mode functions 1028 to communicate with a kernel mode graphics driver 1029. The kernel mode graphics driver 1029 communicates with the graphics processor 1032 to dispatch commands and instructions.

To the extent various operations or functions are described herein, they can be described or defined as hardware circuitry, software code, instructions, configuration, and/or data. The content can be embodied in hardware logic, or as directly executable software ("object" or "executable" form), source code, high level shader code designed for execution on a graphics engine, or low level assembly language code in an instruction set for a specific processor or graphics core. The software content of the embodiments described herein can be provided via an article of manufacture with the content stored thereon, or via a method of operating a communication interface to send data via the communication interface.

A non-transitory machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface is configured by providing configuration parameters or sending signals to prepare the communication interface to provide a data signal describing the software content. The communication interface can be accessed via one or more commands or signals sent to the communication interface.

The following clauses and/or examples pertain to further embodiments:

One example embodiment may be a method comprising defining a coarse-to-pixel mapping for a group of pixels, performing coarse pixel shading and performing pixel shading in a hardware processor for said group using said coarse-to-pixel mapping. The method may also include determining which pixels in the group are lit. The method may also include using the same kernel for coarse and pixel shading. The method may also include using a single instruction multiple data shader. The method may also include using the same lanes for both coarse and pixel shading. The method may also include performing pixel shading for the group after performing coarse shading for the group. The method may also include using an instruction for switching program execution from coarse rate to pixel rate in the same kernel program running a single instruction multiple data machine. The method may also include coarse shading a plurality of quads at a time and then pixel shading each of said quads successively.

Another example embodiment may be a method comprising mapping coarse and pixel shading with phases into one monolithic single instruction multiple data program, determining pixels locations in barycentric space, and suppressing a group of pixels if all pixels in the group are unlit. The method may include compiling coarse-to pixel mapping, pixel lit mask, group of pixels, and barycentrics in a fixed function accelerator. The method may include implementing pixel-rate phases as a loop over pixel groups determined by the fixed function accelerator. The method may include setting an execution mask in each loop, using coarse-to-pixel mapping to swizzle interstage data between coarse-to-pixel rate phases, and using barycentrics to interpolate per-pixel attributes in each loop pass.

In another example embodiment one or more non-transitory computer readable media storing instructions executed by a processor to perform a sequence comprising defining a coarse-to-pixel mapping for a group of pixels, performing coarse pixel shading, and performing pixel shading in a hardware processor for said group using said coarse-to-pixel mapping. The media may include said sequence including determining which pixels in the group are lit. The media may include said sequence including using the same kernel for coarse and pixel shading. The media may include said sequence including using a single instruction multiple data shader. The media may include said sequence including using the same lanes for both coarse and pixel shading. The media may include said sequence including performing pixel shading for the group after performing coarse shading for the group. The media may include said sequence including using an instruction for switching program execution from coarse rate to pixel rate in the same kernel program running a single instruction multiple data machine. The media may include said sequence including coarse shading a plurality of quads at a time and then pixel shading each of said quads successively.

Another example embodiment may be an apparatus comprising a hardware processor to define a coarse-to-pixel mapping for a group of pixels, perform coarse pixel shading, and perform pixel shading in a hardware processor for said group using said coarse-to-pixel mapping and a storage coupled to said processor. The apparatus may include said processor to determine which pixels in the group are lit. The apparatus may include said processor to use the same kernel for coarse and pixel shading. The apparatus may include said processor to use a single instruction multiple data shader. The apparatus may include said processor to use the same lanes for both coarse and pixel shading. The apparatus may include said processor to perform pixel shading for the group after performing coarse shading for the group. The apparatus may include said processor to use an instruction for switching program execution from coarse rate to pixel rate in the same kernel program running a single instruction multiple data machine. The apparatus may include said processor to coarse shade a plurality of quads at a time and then pixel shading each of said quads successively. The apparatus may include a memory controller hub. The apparatus may include a wireless transceiver.

Various components described can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Besides what is described herein, various modifications can be made to the disclosed embodiments and implementations of the invention without departing from their scope. Therefore, the illustrations and examples herein should be construed in an illustrative, and not a restrictive sense. The scope of the invention should be measured solely by reference to the claims that follow.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
defining a coarse-to-pixel mapping for a group of pixels;
performing coarse pixel shading using interpolated attributes;
performing pixel shading in a hardware processor for said group using data from coarse pixel shading and the interpolated attributes; and
performing sample shading using data from pixel shading and the interpolated attributes.

2. The method of claim 1 including determining which pixels in the group are lit.

3. The method of claim 1 including using the same kernel for coarse and pixel shading.

4. The method of claim 3 including using a single instruction multiple data shader.

5. The method of claim 4 including using the same lanes for both coarse and pixel shading.

6. The method of claim 1 including performing pixel shading for the group after performing coarse shading for the group.

7. The method of claim 1 including using an instruction for switching program execution from coarse rate to pixel rate in the same kernel program running a single instruction multiple data machine.

8. The method of claim 1 including coarse shading a plurality of quads at a time and then pixel shading each of said quads successively.

9. A method comprising:
mapping coarse and pixel shading with phases into one monolithic single instruction multiple data program;
determining pixels locations in barycentric space; and
suppressing a group of pixels if all pixels in the group are unlit.

10. The method of claim 9 including compiling coarse-to pixel mapping, pixel lit mask, group of pixels, and barycentrics in a fixed function accelerator.

11. The method of claim 10 including implementing pixel-rate phases as a loop over pixel groups determined by the fixed function accelerator.

12. The method of claim 11 including setting an execution mask in each loop, using coarse-to-pixel mapping to swizzle interstage data between coarse-to-pixel rate phases, and using barycentrics to interpolate per-pixel attributes in each loop pass.

13. One or more non-transitory computer readable media storing instructions executed by a processor to perform a sequence comprising:
defining a coarse-to-pixel mapping for a group of pixels;
performing coarse pixel shading using interpolated attributes;
performing pixel shading in a hardware processor for said group using data from coarse pixel shading and the interpolated attributes; and
performing sample shading using data from pixel shading and the interpolated attributes.

14. The media of claim 13, said sequence including determining which pixels in the group are lit.

15. The media of claim 13, said sequence including using the same kernel for coarse and pixel shading.

16. The media of claim 15, said sequence including using a single instruction multiple data shader.

17. The media of claim 16, said sequence including using the same lanes for both coarse and pixel shading.

18. The media of claim 13, said sequence including performing pixel shading for the group after performing coarse shading for the group.

19. The media of claim 13, said sequence including using an instruction for switching program execution from coarse rate to pixel rate in the same kernel program running a single instruction multiple data machine.

20. The media of claim 13, said sequence including coarse shading a plurality of quads at a time and then pixel shading each of said quads successively.

21. An apparatus comprising:
a hardware processor to define a coarse-to-pixel mapping for a group of pixels, perform coarse pixel shading using interpolated attributes, perform pixel shading in a hardware processor for said group using data from coarse pixel shading and the interpolated attributes, perform sample shading using data from pixel shading and the interpolated attributes; and
a storage coupled to said processor.

22. The apparatus of claim 21, said processor to determine which pixels in the group are lit.

23. The apparatus of claim 21, said processor to use the same kernel for coarse and pixel shading.

24. The apparatus of claim 23, said processor to use a single instruction multiple data shader.

25. The apparatus of claim 24, said processor to use the same lanes for both coarse and pixel shading.

26. The apparatus of claim 21, said processor to perform pixel shading for the group after performing coarse shading for the group.

27. The apparatus of claim 21, said processor to use an instruction for switching program execution from coarse rate to pixel rate in the same kernel program running a single instruction multiple data machine.

28. The apparatus of claim 21, said processor to coarse shade a plurality of quads at a time and then pixel shading each of said quads successively.

29. The apparatus of claim 21 including a memory controller hub.

30. The apparatus of claim 21 including a wireless transceiver.

* * * * *